(12) United States Patent
Craft et al.

(10) Patent No.: US 10,663,610 B2
(45) Date of Patent: May 26, 2020

(54) SEISMIC DATA ANALYSIS USING OCEAN BOTTOM NODE DATA COLLECTION

(71) Applicant: FAIRFIELD INDUSTRIES INCORPORATED, Sugar Land, TX (US)

(72) Inventors: Kenneth Craft, Missouri City, TX (US); Carsten Udengaard, Sugar Land, TX (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 922 days.

(21) Appl. No.: 14/405,564

(22) PCT Filed: Jun. 4, 2013

(86) PCT No.: PCT/US2013/044177
§ 371 (c)(1),
(2) Date: Dec. 4, 2014

(65) Prior Publication Data
US 2015/0168576 A1    Jun. 18, 2015

Related U.S. Application Data

(60) Provisional application No. 61/655,325, filed on Jun. 4, 2012.

(51) Int. Cl.
*G01V 1/38* (2006.01)
*G01V 1/36* (2006.01)

(52) U.S. Cl.
CPC ............ *G01V 1/38* (2013.01); *G01V 1/36* (2013.01); *G01V 1/3817* (2013.01);
(Continued)

(58) Field of Classification Search
None
See application file for complete search history.

(56) References Cited

U.S. PATENT DOCUMENTS

| 4,805,160 | A | * | 2/1989 | Ishii | G01V 1/22 367/134 |
| 5,119,341 | A | * | 6/1992 | Youngberg | G01S 5/0009 367/5 |

(Continued)

FOREIGN PATENT DOCUMENTS

WO    2013184724    12/2013

OTHER PUBLICATIONS

Hays, David, et al., "An Ocean Bottom Seismic Node Repeatability Study", SEG Las Vegas 2008 Annual Meeting, SEG Technical Program Expanded Abstracts, Nov. 9, 2008, pp. 55-59.

(Continued)

*Primary Examiner* — John E Breene
*Assistant Examiner* — Brandon J Becker
(74) *Attorney, Agent, or Firm* — Bond, Schoeneck & King, PLLC; Jeffrey Powers

(57) ABSTRACT

Methods and systems for minimizing RMS travel time error in a seismic data acquisition. Field measurements of source and receiver coordinates, speed of sound in water as a function of depth and time, receiver timing, and clock drift are first collected. The seismic data is then examined to measure travel time from each source to each receiver. A model travel time is computed based on the field measurements. By iteratively perturbing at least one of the field measured data using a look-up table and calculating the travel time after each perturbation until an acceptable RMS error has been achieved, conditioned seismic data that takes into account the dynamic nature of the water column will (Continued)

provide the basis for creating an accurate seismic map that is unaffected by the changing water conditions.

22 Claims, 14 Drawing Sheets

(52) U.S. Cl.
CPC ........ *G01V 1/3835* (2013.01); *G01V 2200/12* (2013.01); *G01V 2200/14* (2013.01)

(56) References Cited

U.S. PATENT DOCUMENTS

| | | | | |
|---|---|---|---|---|
| 5,691,957 | A * | 11/1997 | Spiesberger | G01S 19/14 367/3 |
| 6,131,694 | A | 10/2000 | Robbins et al. | |
| 6,188,963 | B1 | 2/2001 | Paffenholz | |
| 6,292,754 | B1 * | 9/2001 | Thomsen | G01V 1/28 702/14 |
| 8,120,991 | B2 * | 2/2012 | Koren | G01V 1/32 367/72 |
| 2004/0073370 | A1 | 4/2004 | Dasgupta et al. | |
| 2009/0296519 | A1 | 12/2009 | Keers et al. | |
| 2010/0039894 | A1 * | 2/2010 | Abma | G01V 1/005 367/52 |
| 2011/0122725 | A1 | 5/2011 | Hopperstad | |
| 2011/0273958 | A1 * | 11/2011 | Xia | G01V 1/3817 367/21 |
| 2012/0051178 | A1 * | 3/2012 | Zhang | G01V 1/288 367/50 |
| 2015/0168576 | A1 | 6/2015 | Craft et al. | |
| 2017/0017006 | A1 | 1/2017 | Noss et al. | |

OTHER PUBLICATIONS

Docherty, Paul, et al., "Ambiguities in direct arrival time inversion for ocean bottom nodes", 74th EAGE Conference & Exhibition incorporating SPE EUROPEC 2012, Copenhagen, Denmark, Jun. 4-7, 2012, http://www.fairfieldnodal.com/assets/pdf/DochertyHaysEAGE2012.pdf, retrieved on Apr. 25, 2016, pp. 1-5.
International Search Report for International Application No. PCT/US2013/044177, International Filing Date Jun. 4, 2013 pp. 1-3.

* cited by examiner

Shot File

| | shot_id | sou_x | ux | sou_y | uy | sou_z | |
|---|---|---|---|---|---|---|---|
| 1 | | | | | | | |
| 2 | | | | | | | |
| 3 | | | | | | | |
| . | | | | | | | |
| . | | | | | | | |
| . | | | | | | | |
| n | | | | | | | |

| | uz | time_of_shot | vel | nHits | msErr |
|---|---|---|---|---|---|
| | | | | | |
| | | | | | |
| | | | | | |
| | | | | | |
| | | | | | |
| | | | | | |
| | | | | | |

FIG. 3a

Pick File

| | shot_id | rec_id | picktime | p_ampl |
|---|---|---|---|---|
| 1 | | | | |
| 2 | | | | |
| 3 | | | | |
| . | | | | |
| . | | | | |
| . | | | | |
| n | | | | |

FIG. 3b

| | rec_id | rec_x | ux | rec_y | uy | rec_z | uz |
|---|---|---|---|---|---|---|---|
| 1 | | | | | | | |
| 2 | | | | | | | |
| 3 | | | | | | | |
| . | | | | | | | |
| . | | | | | | | |
| n | | | | | | | |

| drift_A | uA | drift_B | uB | ZSTART_D | Zdploy_D | elapsed_D |
|---|---|---|---|---|---|---|
| | | | | | | |
| | | | | | | |
| | | | | | | |
| | | | | | | |
| | | | | | | |
| | | | | | | |

| nHits | maxDrift_ms | C | uC | msErr | ZEND_D | D_WT | Total_drift_out |
|---|---|---|---|---|---|---|---|
| | | | | | | | |
| | | | | | | | |
| | | | | | | | |
| | | | | | | | |
| | | | | | | | |
| | | | | | | | |

FIG. 3c

SEISMIC DATA ANALYSIS USING OCEAN BOTTOM NODE DATA COLLECTION

CROSS REFERENCE TO RELATED APPLICATION

The present application is a U.S. national phase filing of PCT/US2013/044177, filed Jun. 4, 2013 and claims priority to U.S. Provisional Patent Application Ser. No. 61/655,325, filed Jun. 4, 2012, the entirety of which is incorporated by reference.

BACKGROUND

The present invention relates generally to seismic data acquisition and analysis through conducting a seismic survey, and more particularly to methodologies for improving the accuracy of the results based upon the seismic data analysis.

The generation and recording of seismic data involves many different receiver configurations, including laying geophones or seismometers on the surface of the Earth or seafloor, towing hydrophones behind a marine seismic vessel, suspending hydrophones vertically in the sea or placing geophones in a wellbore (as in a vertical seismic profile) to record the seismic signal. A source, such as a vibrator unit, dynamite shot, or an air gun, generates acoustic or elastic vibrations that travel into the Earth, pass through strata with different seismic responses and filtering effects, and return to the surface to be recorded as seismic data. Optimal acquisition varies according to local conditions and involves employing the appropriate source (both type and intensity), optimal configuration of receivers, and orientation of receiver lines with respect to geological features. This ensures that the highest signal-to-noise ratio can be recorded, resolution is appropriate and extraneous effects such as air waves, ground roll, multiples and diffractions can be minimized or distinguished, and removed through processing.

Underwater seismic exploration is widely used to locate and/or analyze subterranean geological formations for the presence of hydrocarbon reservoirs. One type of survey uses a boat towing a plurality of air guns and an array of ocean bottom nodes (OBN) placed on the ocean floor. The nodes are placed on the ocean floor by means of a remote operated vehicle (ROV) and subsea loader; typically the ROV and subsea loader are deployed from a deployment/retrieval boat separate from the tow or gun boat.

To acquire the data, compressed air shots are released from the air guns at known periodic intervals and the location and timing of each shot is recorded. Likewise, the timing and intensity of the nodes sensing of each compressed air shot is recorded. The data is typically collected for at least 30 days to cover one full tidal cycle, but may be collected over a longer period depending on, for example, the size of the area being surveyed.

Four-dimensional seismic data collection generally comprises three-dimensional (3D) seismic data acquired at different times over the same area to assess changes in a producing hydrocarbon reservoir with time. Changes may be observed in fluid location and saturation, pressure and temperature. 4D seismic data is one of several forms of time-lapse seismic data. Such data can be acquired on the surface or in a borehole. Time lapse seismic data involves seismic data collection from the surface or a borehole acquired at different times over the same area to assess changes in the subsurface with time, such as fluid movement or effects of secondary recovery. The data are examined for changes in attributes related to expressions of fluid content. Time-lapse seismic data can repeat 2D, 3D (which is known as 4D seismic data), crosswell and VSP (vertical seismic profile) data.

Increased use of OBN acquisition for deep water time lapse monitoring has shown a need to have very accurate shot and receiver positions, as well as a good understanding of the high frequency water column velocity and height variations during acquisition that affect seismic event timing. As mentioned, the nodes are typically on the seafloor in excess of thirty days and thus observe at least one full cycle of tides and possibly large changes in water column velocity. The tide cycles are problematic because they affect the vertical distance between the nodes and shots during acquisition. High frequency velocity variations must be understood in order for water column statics corrections to be computed to correct the data to a single water depth dependent velocity for downstream processing and imaging of the OBN data.

Ocean bottom nodes all have internal clocks that are independent of the master clock (typically GPS time), which serves as the reference for all shots in a given survey. Each internal clock experiences some amount of clock drift, due to factors such as crystal oscillator aging, human error in the calibration, and simply delayed activation as compared to the master GPS clock, during the deployment of the node. For each node, the clock drift value is measured when the node is synced with the master clock upon retrieval of the node from the seafloor. However, there are instances where this measurement cannot be made or is made unreliably, which leads to uncertainty in the clock drift measurement. To determine clock drift in nodes with unreliable field measurements, spatially neighboring shot traces with significantly different time of acquisition are compared and a clock drift is chosen that removes discontinuities in the direct arrival. However, if there is a corresponding change in water velocity, due to changes in acquisition time, then a discontinuity analysis can be deceiving or lead to incorrect drift adjustments.

A process that corrects for only one of shot positioning, receiver positioning, receiver timing, or water column velocity will be subject to leakage of errors in the other dimensions. A technique must be used that simultaneously solves for source position, receiver position, receiver clock drift, and water velocity as a function of acquisition time.

It is a primary object and advantage of the present invention to provide a method, system, and product that will solve shot and receiver positions, receiver timing, and the water column velocity model simultaneously.

Other objects and advantages of the present invention will in part be apparent to those of skill in the art, and in part appear hereinafter.

SUMMARY OF THE INVENTION

The time it takes energy to travel from the source to the node is determined by the relative positions of the shot (i) and receiver (j) and the speed of sound, or slowness s, through water (Eqn. 1) (Mitchell et. al.). The direct arrival time recorded by the node is the travel time of the energy plus the clock drift error at the time of the shot (Eqn. 2). A travel time inversion process minimizes the error between the actual picked direct arrival times and the modelled (by Eqn. 1 and Eqn. 2) direct arrival times to produce a solution for the shot and receiver positions, receiver clock drift, and water column velocity that best fits the data.

$$t_{ij} = \tau_i + \int_{source_i}^{node_j} s(x, y, z, \tau_i) dl \qquad \text{Eqn. 1}$$

$$T_{ij} = t_{ij} + d_{ij} \qquad \text{Eqn. 2}$$

To condition data for direct arrival picking, an angular designature of the direct arrival is performed correcting the direct arrival to zero phase. At larger crossline offsets the lateral spacing of each source string in the source array causes the direct arrival to appear as a triplet instead of a single wavelet. Directional designature stabilizes picking of the direct arrival times at longer crossline offsets, by collapsing the triplet into a single wavelet. Angle dependent deghosting of the direct arrival allows the picking to be made on the peak of a zero phase wavelet. Typically the direct arrival time is picked out to the smaller of 3500 m or three times the receiver depth, in order to avoid picking direct arrival times where refracted energy interferes with the direct arrival. Designature of the direct arrival effectively moves the source to the sea surface, elevation of 0. These elevations are then set to the modelled tide height, relative to mean sea level, at the time of the shot. The initial receiver depths are also corrected for tide height based on the time of node deployment, when the initial depth measurement was made by the ROV (Remotely Operated Vehicle).

The travel time inversion process requires an initial solution for the shot and receiver positions, the receiver timing, and the water column velocity. The positions and timing are generally obtained using non-iterative methods using a constant water velocity assumption. Position and timing initial solutions can be a "close enough" solution to begin the travel time inversion process. The initial velocity model is derived from pressure, conductivity, and temperature measurements recorded during water column transits of acquisition equipment while deploying and retrieving nodes.

Each trace, within the selected offset range, is correlated with the nearest offset of the given node. When the correlation coefficient is unacceptably low, the time pick is rejected from the inversion process.

In one aspect of the invention, therefore, a method is provided for minimizing RMS error in data collected during a seismic survey over a predetermined area, comprising the steps of
a) obtaining field measurements of i) source x, y, and z positions, ii) receiver x, y, and z positions, iii) speed of sound in water as a function of time and depth, iv) receiver timing, and v) clock drift; b) measuring travel time from each source to each receiver; c) determining a model travel time based on each of said field measurements; and d) perturbing at least a first one of said field measurements and re-calculating travel time until an acceptable RMS error has been calculated.

In another aspect of the invention, a computer program stored on a non-transient storage medium and adapted to be run on a computer processor for purposes of minimizing RMS error in data collected during a seismic survey over a predetermined area, comprising program code for obtaining field measurements of source positions, receiver positions, speed of sound in water as a function of time and depth, receiver timing, and clock drift; measuring travel time from each source to each receiver; determining a model travel time based on each of said field measurements; and perturbing at least a first one of said field measurements and re-calculating travel time until an acceptable RMS error has been calculated.

In another aspect of the present invention, a computer system is provided including a computer program stored on a non-transient storage medium and adapted to be run on a processor, the computer program iteratively minimizing RMS error in data collected during a seismic survey over a predetermined area, comprising computer code for: obtaining field measurements of source positions, receiver positions, speed of sound in water as a function of time and depth, receiver timing, and clock drift; measuring travel time from each source to each receiver; determining a model travel time based on each of said field measurements; and perturbing at least first one of said field measurements and re-calculating travel time until an acceptable RMS error has been calculated.

BRIEF DESCRIPTION OF THE DRAWINGS

The present invention will be more fully understood and appreciated by reading the following Detailed Description in conjunction with the accompanying drawings, in which:

FIG. 3a-3c are structural diagrams of look-up tables used with the present invention;

DETAILED DESCRIPTION

Figure 1:
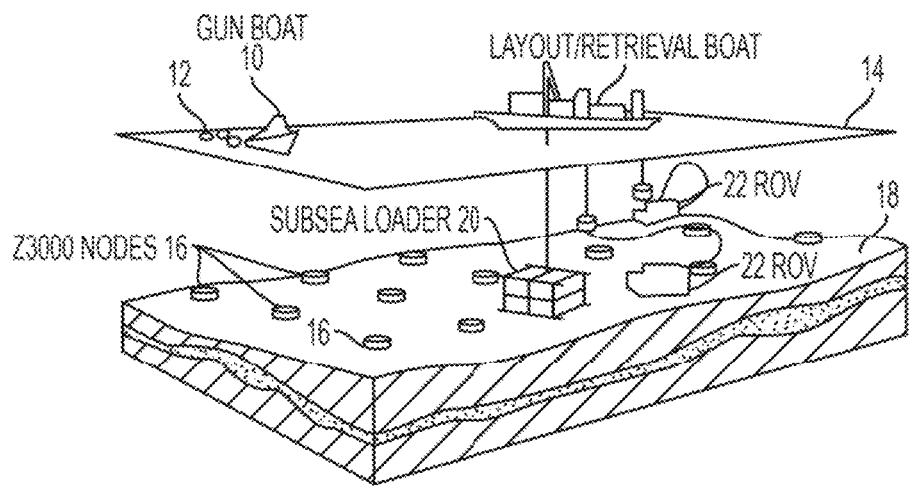
FIG. 1 is a schematic view of a seismic surveying system.
Figure 2:
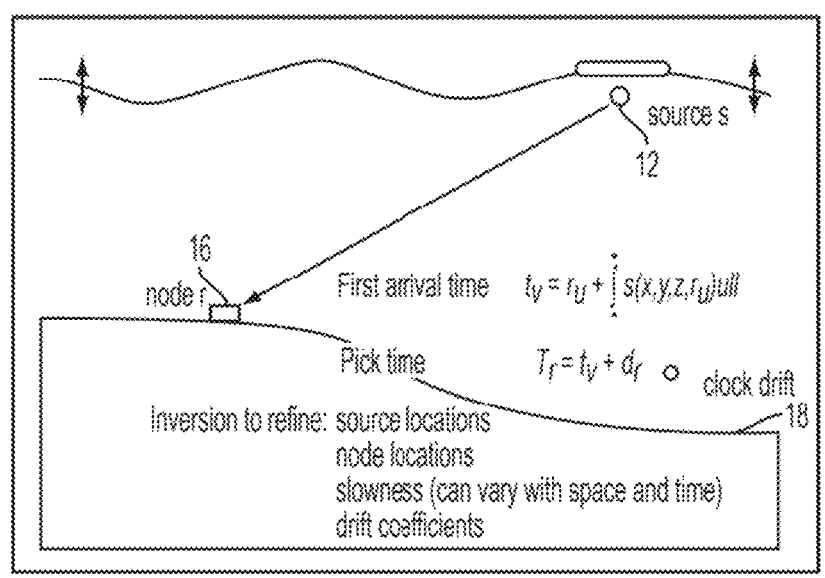
FIG. 2 is a schematic that shows the geometry in a seismic surveying system that is relied upon in the present invention.

Referring now to the drawings, wherein like reference numerals refer to like parts throughout, there is seen in FIG. 1 an illustrative view of the paradigm used to collect seismic data using ocean bottom nodes (OBNs). In the view of FIG. 1, a ship 10, pulls an array of energy sources (e.g., compressed air guns) 12 in serpentine fashion throughout a grid 14 of predetermined area over a predetermined time frame (e.g., 60-90 days). OBNs 16 are placed on the ocean floor 18 by means of a loader 20 that carries them from a ship 17 (could also be ship 10) to the ocean's floor, and an ROV 22 that takes them from the loader 20 and places them at a predetermined position on the ocean floor. Once a certain number of the OBNs 16 have been placed, ship 10 begins its serpentine movement around the grid 14. The energy sources 12 expel an energy source towards the ocean's floor 18 at predetermined intervals, and the energy is received by OBNs 16 that is in the energy source's pathway. Once all OBNs 16 (also referred to as "nodes" or "receivers") have been placed on the ocean floor, the loader 20 and ROV 22 return to the surface where water column velocity measurement data and certain receiver position data can be retrieved. In FIG. 2, the geometry of the source/shots 12 and node/receiver/OBN 16 is illustrated.

It is well understood that each of the OBNs has an atomic clock as well as the energy sensors (e.g., hydrophones and geophones) for sensing the energy in the down travelling waves (direct energy), as well as the up travelling waves (reflected energy). Upon deployment from and retrieval to the ship, each atomic clock is synchronized with a GPS based master clock. Synchronization requires setting the start frequency of the atomic clock such that its timing matches that of the GPS based master clock. As is understood in the art, the atomic clocks will experience some measurable drift; drift is due to (1) a linear shift caused by failure to perfectly set the starting frequency during calibration, (2) quadratic drift (or drift that is represented by a quadratic relationship) due to the atomic clock's crystal decaying over time, and (3) a form of bulk drift that is simply human error caused by less than perfect start times. Overall clock drift can be measured in the field when each node is recovered at the end of the data collection, and the elapsed time for each atomic clock is compared to the elapsed time on the GPS master clock.

Figure 6:
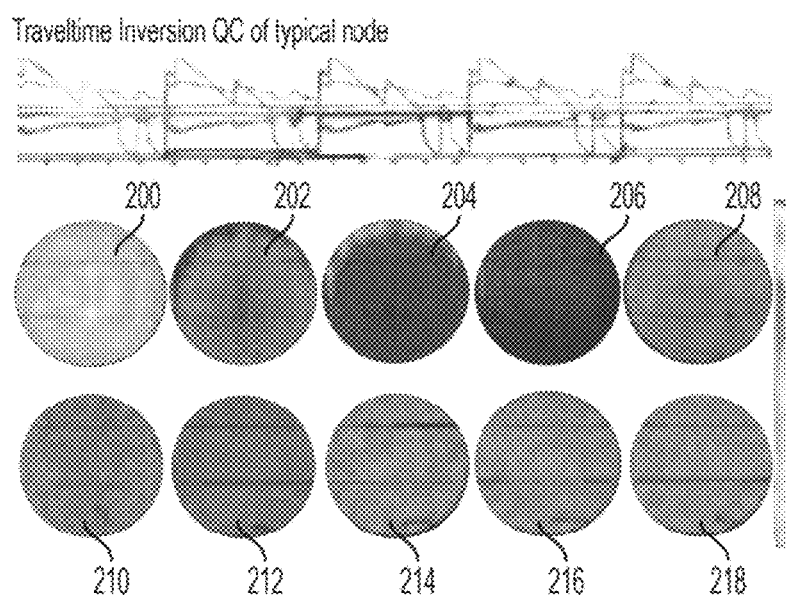
FIG. 6 is a series of plots representing a map view of a shot by shot result for a given receiver.

Other field measured data points include the coordinates for each OBN (receiver) 16. The X and Y positions for the OBNs 16 are determined using range finding tools used at the surface, but are subject to distance related errors with the deeper the water producing larger errors. The Z position of each OBN 16 is determined based on a pressure reading at the time of placement. The coordinates of each energy source each time a "shot" (of energy) is released is also recorded using GPS technology, but is subject to slight variations due to undulations caused by surface waves in the ocean. Water column velocity, or the speed (or the slowness) of sound in water as a function of time and depth is dynamic in nature due to tides, currents, water salinity changes, water temperature changes, and other known factors, but regardless is field measured at the time of OBN deployment by using known technology present on the loader 20 that factors in pressure, conductivity, and temperature, and this constant water velocity assumption is used in calculating a model travel time Each of these field measurements permits a model travel time to be calculated using known equations (equations (1) and (2) above ad also reproduced in FIG. 2). Once each OBN 16 is recovered and the data acquired in each is loaded into a computer for analysis, the model travel time can be compared to the actual or "picked" travel time that is calculated based on the actual data present in each OBN 16. In order to more accurately model the data and account for the variations/fluctuations due to the dynamic nature of the water column and other errors in the field measurements, a conjugate gradient (or other mathematical model may be used) is performed on the data using a series of look-up tables, as structurally represented in FIGS. 3a-3c, and a computer that is programmed to run iterations of the inversion equations (1) and (2) above by first perturbing or giving freedom to the X and Y position data of each receiver, second, perturbing or giving freedom to quadratic clock drift, and third, by perturbing the X, Y, and Z position data of the sources, as more fully described below. The data can be further smoothed and the RMS error between the model arrival time and picked arrival time minimized by running perturbations of the Z position data of each receiver, linear clock drift, and bulk clock drift. After each perturbation is run, a graphical representation of the RMS error can be produced by the computer program and viewed for analysis, an example of which is provided in FIG. 7d. In addition, the incremental improvement in RMS error minimization can be graphically viewed in a series of 10 circle plots, as represented in FIG. 6, wherein, the RMS error for each receiver is graphically viewable after perturbing each of the field measured variables through use of the look-up tables and application of the conjugate gradient.

To further understand the nature of the invention, a description of the problem to be solved may be useful.

The time of arrival $t_{ij}$ of the direct wave from Source I measured by Node j is written $$t_{ij} = \tau_i + \int_{z_{s_i}}^{x_{N_j}} s(l, \tau_i) dl + d_{ij}, \qquad (1)$$

where $t_i$ is the time of Source i, $x_{si}=(x_{si}, y_{si}, z_{si})$ is the location of Source i, $x_{Nj}=(x_{Nj}, y_{Nj}, z_{Nj})$ is the location on the seabed of Node j, and s is slowness in the water column. The equation is a familiar one except perhaps for the quantity $d_{ij}$ which is the drift of Node j's clock at time Clock drift is caused by variations in the frequency of a node's crystal oscillator. For this study we take that variation to be the sum of a fixed frequency of offset error and a so-called aging term:

$$f_j = f_j^0 \left( 1 + 10^{-10} a_j + 10^{-10} \frac{b_j(t - T_j^0)}{86,400} \right), \qquad (2)$$

where $f_j$ is Node j's oscillator frequency in Hertz at time t, $f_j^0$ is the oscillator's designated frequency, $a_j$ characterizes the fixed frequency error and $b_j$ the oscillator's aging rate per day (division by 86,400 gives aging rate per second). Finally, $T_j^0$ is the time at which the clock was synchronized. It is straightforward to show that the resulting clock drift, in seconds, at the time of Source i is given by $$d_{ij} = 10^{-10} \left[ a_j(\tau_i - T_j^0) + \frac{1}{2}\left(\frac{b_j}{86,400}\right)(\tau_i - T_j^0)^2 \right]. \qquad (3)$$

Clearly, a frequency offset error leads to drift linear with time: a value of $a_j$ equal to 10, for example, would contribute 86.4 microseconds per day to the total drift. Aging results in quadratic variation with time: a value of $b_j$ equal to 2, for example, would add 21.6 milliseconds of drift after 50 days. (See Olofsson and Woje (2010) for a comprehensive discussion of clock timing, including oscillator behaviour more complex than equation (2).)

Note that the slowness, s, in equation (1) depends on the time of the source as well as the travel path between the source and the node. Motivated by the availability of ROV sound speed measurements in node surveys (see, for example. Hays et al., 2008. FIG. 3) we parameterize slowness in the water column as $$s(x,y,z,t) \approx s(z,t) = s_0(z,t) + \sigma(t). \quad (4)$$

In this equation. $s_0$ is a fixed background slowness, obtained for example, by interpolation of ROV data recorded at ROV transit times. The quantity σ is a constant correction (applied at all depths) to the background slowness at time t. The approximation in equation (4) indicates that lateral variations in the water column at any given time are taken to be negligible. (This assumption may be violated, for example, as ocean currents push new water into the survey area.) The unknown quantities that we typically seek to obtain through inversion of the direct arrival times are listed below:

$$x_{s_i}, y_{s_i} \; i=1, \ldots, n_s$$

$$x_{N_j}, y_{N_j}, z_{N_j}, a_j, b_j \; j=1, \ldots, n_N$$

$$\sigma_k \; k=1, \ldots, n_\sigma \quad (5)$$

where $n_s$ is the number of sources $n_N$ is the number of nodes, and the time duration of the survey has been divided into $n_\sigma^{-1}$ intervals, with the $k_{th}$ time interval bounded by constant slowness corrections $\sigma_k$ and $\sigma_{k+1}$. The unknowns make up the elements of a model vector m. Given a first guess, $m_0$, at the model we linearize equation (1) obtaining $$T(m) \approx T(m_0) + A(m_0) \Delta m. \quad (6)$$

Here, T is a vector of first arrival time picks, A is a matrix of partial derivatives and Δm is a vector of perturbations to the first guess. (Picks are relative to source times; in other words, $\tau_i$ is taken to the left hand side of equation (1) in order to form T.) Equation (6) is solved for Δm. For large problems, we typically use an iterative method such as conjugate gradients. For small problems the singular value decomposition, or svd, is feasible and insightful. We apply this approach next to a small synthetic survey.

Synthetic Example

Figure 8A:
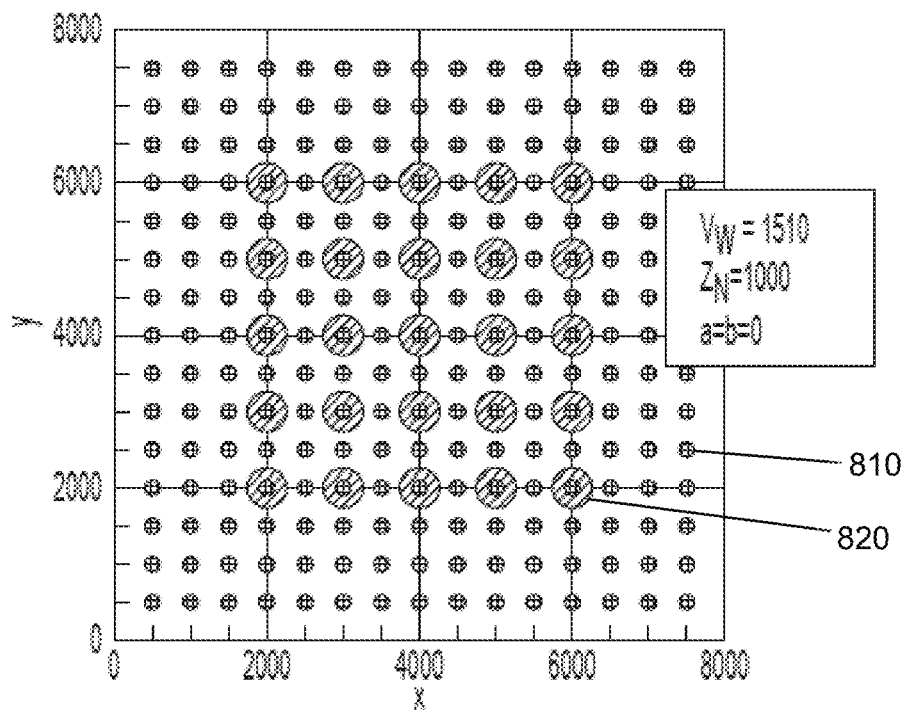
FIG. 8a is an illustration of the layout of the planned synthetic node survey with nodes 810 and sources 820, and where $V_W$ is water velocity, $Z_N$ is node depth, and a and b are node drift coefficients; the illustrated numbers correspond to the first guess $M_0$ in the inversion.

FIG. 8a shows the "planned" layout of the survey. There are 25 nodes spaced at 1000 m and 225 sources spaced at 500 m. The survey is acquired from bottom to top and left to right, one shot every six hours for 56 days. Clocks are synchronized one day before shooting begins. Unknowns in the problem are those listed in (5) above. The first guess. $m_0$, uses the x-y positions shown in the figure. The first guess at node depth is taken to be 1000 m for all nodes and the first guess at the drift coefficients is zero for all nodes. Background velocity is assumed constant at 1510 ms$^{-1}$ and a constant correction to the background is sought at one-day intervals. The total number of unknowns in the problem is thus equal to 2×225+5×25+57=632. Finally, allowing offsets up to 3000 m yields a total of 2442 picks. True parameter values, those used to compute the true arrival times, are described later.

Figure 8B:
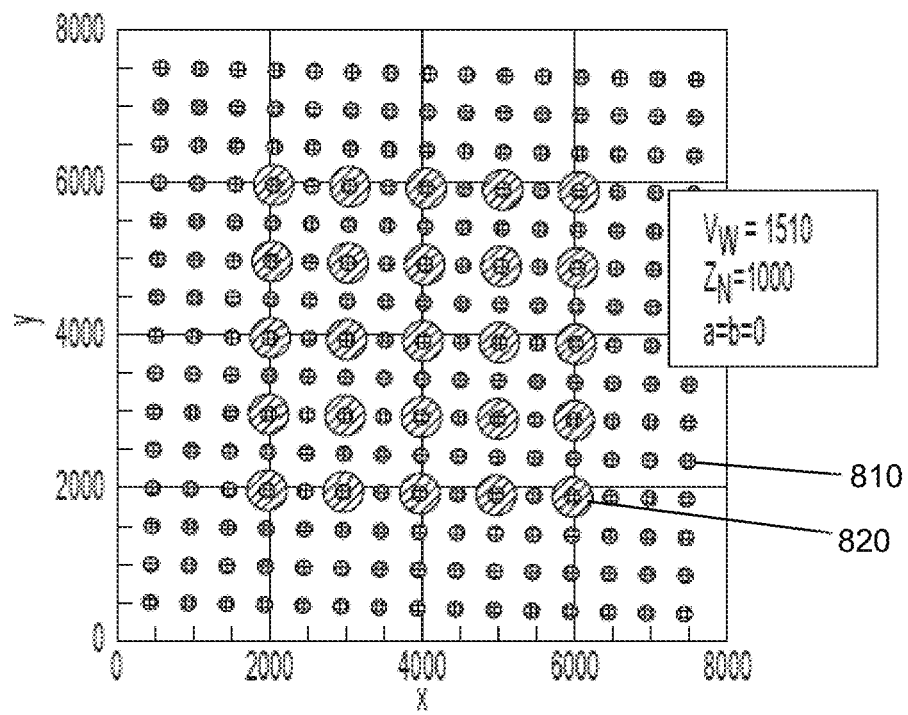
FIG. 8b is an illustration of the layout of the planned synthetic node survey with $M_0 + 2000 V_1$, where $V_1$ is one of three null vectors describing translation and rotation of the survey geometry; the velocity, node depths and node drift coefficients are unchanged.

Svd reveals four singular vectors in the null space of A in this problem. Three of the singular vectors describe translation and rotation of the survey in the x-y plane. FIG. 8b illustrates one of these. To get this figure we simply scaled the singular vector and added it $m_0$. A large scalar was chosen for illustration purposes. This part of the null space is easily understood, since translation and/or rotation of all nodes and sources has no effect on travel time. In fact, the same null space exists when solving just for source and receiver x-y's.

Figure 8C:
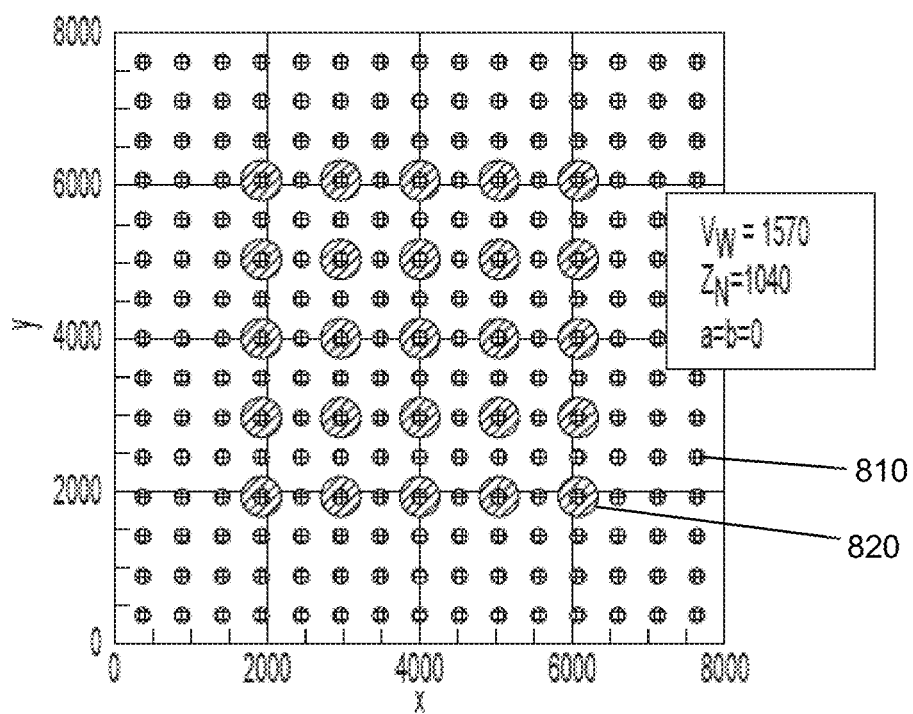
FIG. 8c is an illustration of the layout of the planned synthetic node survey with $M_0 + 2000 V_4$, where $V_4$ is a null vector causing expansion or contraction of the survey, combined with change in velocity; node drift coefficients are unchanged.
Figures 9A, 9B, 9C, 9D, 9E, 9F, 9G, 9H, 9I, 9J, 9K, 9L, 9M, 9N, 9O, 9P, 9Q, 9R:
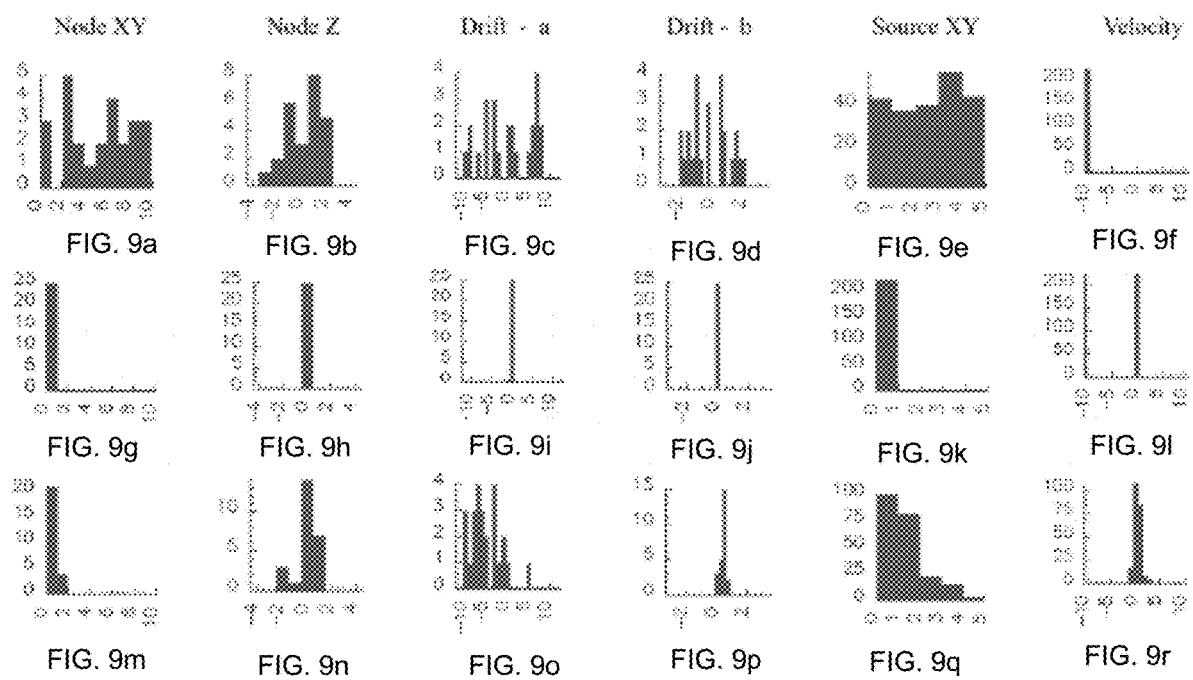
FIGS. 9a-9r are histograms showing the results of inversions of noise-free and noisy data. From left to right, quantities shown are: lateral node positioning, node depth, node drift coefficient a, node drift coefficient b, source lateral positioning, and velocity in the water. Top row: the difference between the true model and the starting model, i.e. $M - M_0$. Middle row: the difference between the true model and the inverted model for noise-free picks. Bottom row: the difference between the true model and the inverted model when ±ms of noise is added to the picks.

The fourth null vector is illustrated in FIG. 8c. On close inspection of this figure it can be seen that the survey has expanded. Also, nodes are deeper and water velocity is greater. To understand this part of the null space consider stretching the survey laterally so that any two points initially separated by lateral distance R become separated by distance αR. Next, holding the shot depths fixed, stretch vertically by the same factor α. Finally, multiply the velocity by α. The net effect is that travel times are unchanged. FIG. 8c has α=1.04.

There is no non-zero component of the drift coefficients in the null space described above. Drift does however feature prominently in a number of singular vectors with very small singular values (not shown). These singular vectors indicate that the drift coefficients a and b may be trading-off; but there are non-zero contributions from the other variables as well. We illustrate by solving the synthetic problem, first with noise-free and then with noisy data.

FIGS. 9a-9f summarize the differences between the true model and the starting model used in the inversion. The true model has nodes and sources randomly displaced from the planned locations: nodes are shifted laterally as much as 10 m, while sources are displaced up to 5 m. Node depth is within 3 in above or below 1000 m. Clock drift coefficients are randomly chosen in the range ±10 for a, and ±2 for b. Water velocity is constant throughout the entire survey at 1500 ms$^{-1}$.

FIGS. 9g-9l show the differences between the true model and the result of an inversion when the data are noise-free first arrival times. We have again used svd (the four null vectors are excluded). The inversion is exact in this case. FIGS. 9m-9r show the result of an inversion with noisy data. Here the first arrival times were contaminated with uniformly random noise in the range ±1 ms. The figure indicates that node locations are accurately determined to within 2 m laterally in this example. The same is true for most of the sources. (The larger errors occur near the edges of the survey where picks are few.) Small discrepancies in node depth (mostly too shallow) appear to be compensated by small errors in water velocity (mostly too slow). Clearly, the drift coefficients are sensitive to noise; however when the total drift at the end of the survey is computed it is found to be accurate to within a. few milliseconds—the drift coefficients are trading off.

Figure 4:
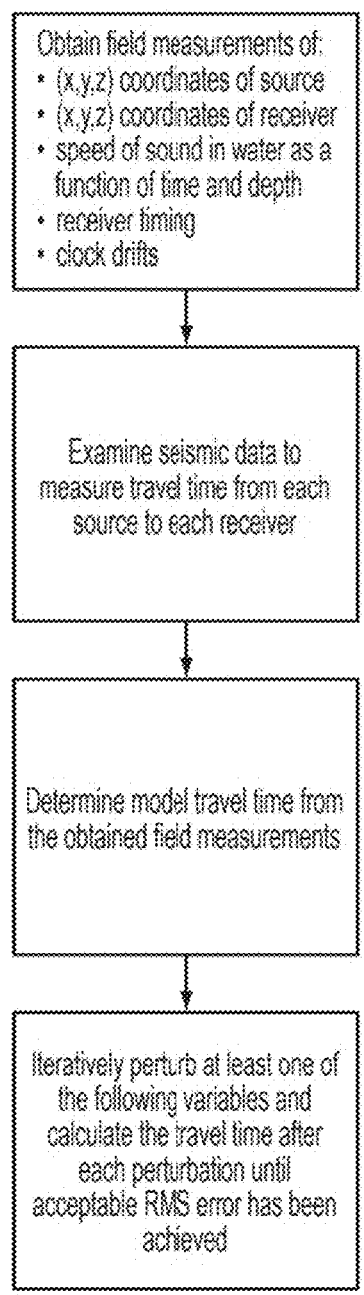
FIG. 4 is a high level flow chart.

At a high level, as shown in the flow chart of FIG. 4, an aspect of the present invention provides a method involving taking field measurements of source and receiver coordinates, speed of sound in water as a function of depth and time, receiver timing, and clock drift are first collected. The seismic data is then examined to measure travel time from each source to each receiver. A model travel time can then be computed based on the field measurements. By iteratively perturbing at least one of the field measured data using a look-up table and calculating the travel time after each perturbation until an acceptable RMS error has been achieved, conditioned seismic data that takes into account the dynamic nature of the water column will provide the basis for creating an accurate seismic map that is unaffected by the changing water conditions.

Figure 5A:
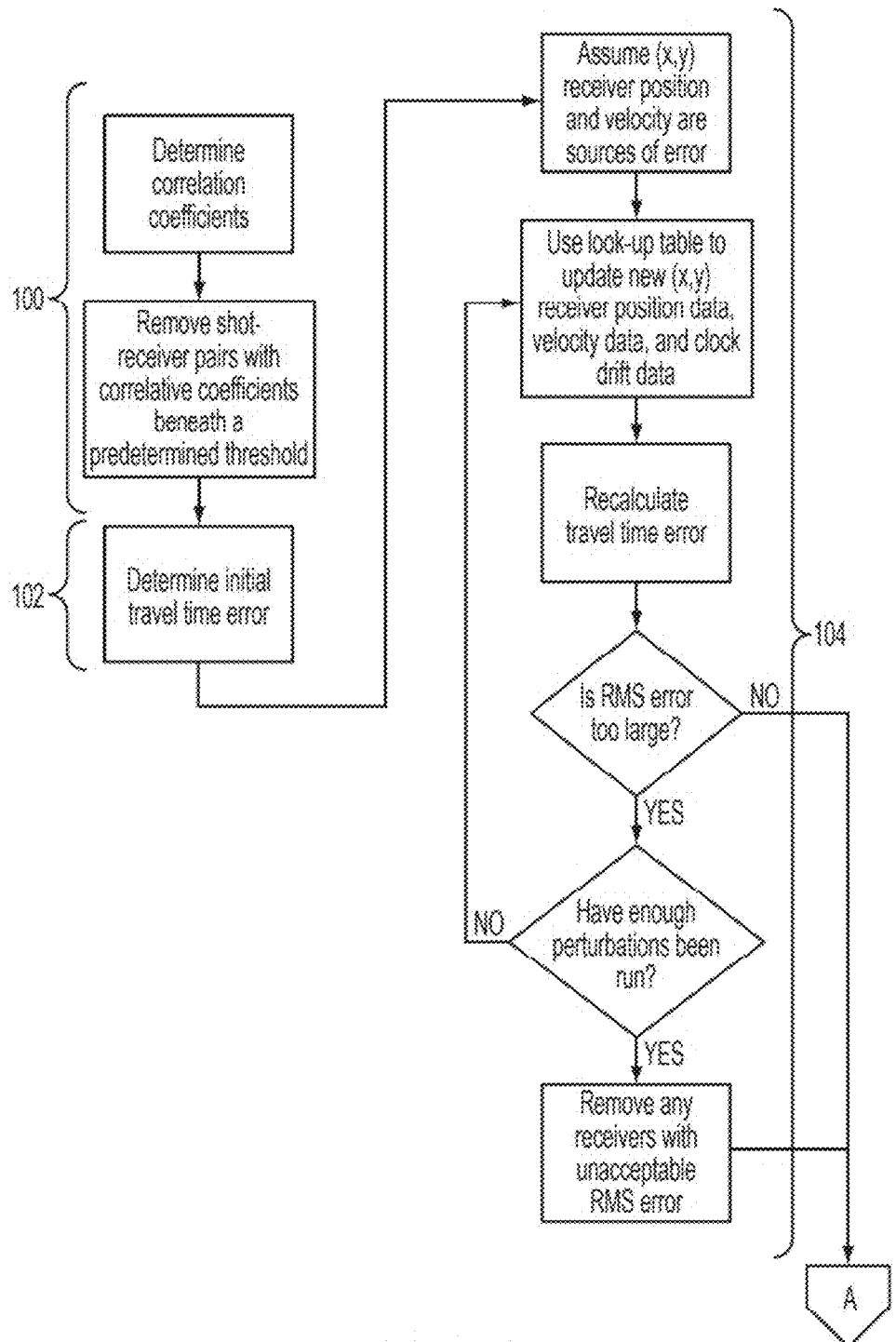
FIGS. 5a-5b are flow charts illustrating an aspect of the present invention.
Figure 5B:
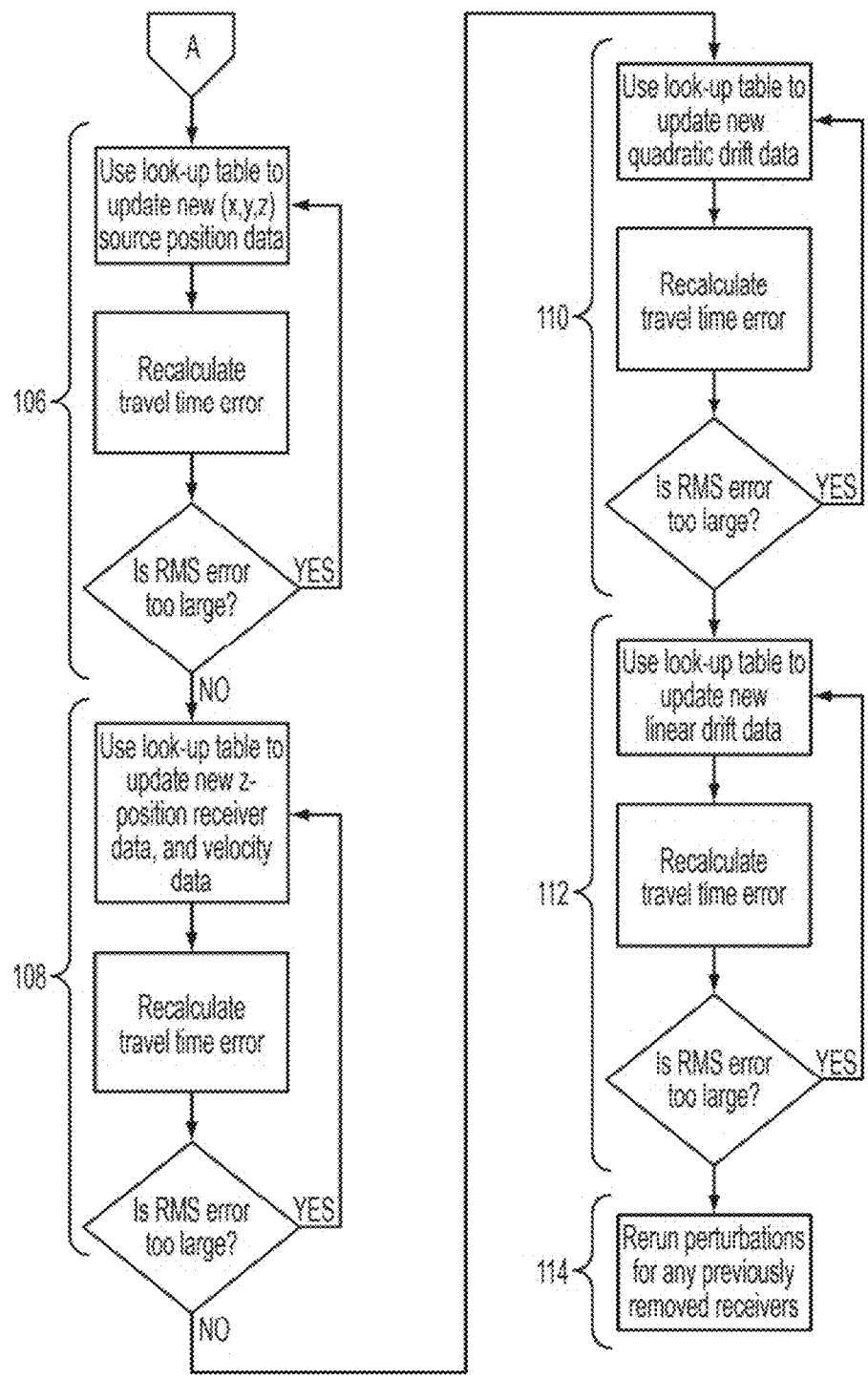

Referring to the flow charts of FIGS. 5a and 5b, the more detailed conjugate gradient process by which the RMS error between the model arrival time and picked arrival time is minimized is as follows:

To begin, in step 100, correlation coefficients for each receiver are determined so as to make a qualitative pick assessment, and if there are any source-receiver pairs with correlation coefficients below a certain threshold (e.g., 95%), those source-receiver pairs are removed from consideration and not analyzed. However, in deep water there is typically very little noise and the correlation coefficients are generally very high. Next, in step 102, an initial travel time error is determined using a constant water velocity assumption (i.e., assuming the water column velocity does not change over time).

The next step 104 uses the look-up tables to run perturbations by updating, or giving freedom to, the receiver x and y position data. For certain receivers that have higher RMS error, simultaneously with updating the x and y receiver position data, the clock drift (linear, quadratic, and bulk) will also be updated. Perturbations will be continuously run until an acceptable RMS error has been achieved. If after a predetermined threshold of perturbations have been run there are still some receivers with unacceptably high RMS error, those receivers are simply removed from the look-up table and not reintroduced into the analysis until after all perturbations have been fully run, as will be explained hereinafter.

Next, in step 106, the x, y, and z position data for each source is allowed freedom to be updated and perturbations run using data from the look-up table. These perturbations are continuously run until an acceptable RMS error has been achieved, as illustrated in step 106.

To further refine the RMS error, the Z position data of the receivers is then allowed freedom to be updated using data pulled from the look-up tables, as illustrated in step 108. After each update the perturbation is run and the RMS error determined, in step 108. Once the RMS error is acceptably low based on the receiver z position data, the look up tables are then used to allow freedom to the quadratic clock drift, in step 110. After sufficient perturbations have been run with freedom given to the quadratic clock drift, the same perturbation model is run while giving freedom to the linear clock drift in step 112.

Once the RMS error is sufficiently low after having given freedom to the linear clock drift, the previously removed receivers (from step 104) are added back in to the look-up tables in step 114, and perturbations will be continually run on just those receivers until the RMS error for each approximates the RMS error for neighbouring receivers.

Figure 7A:
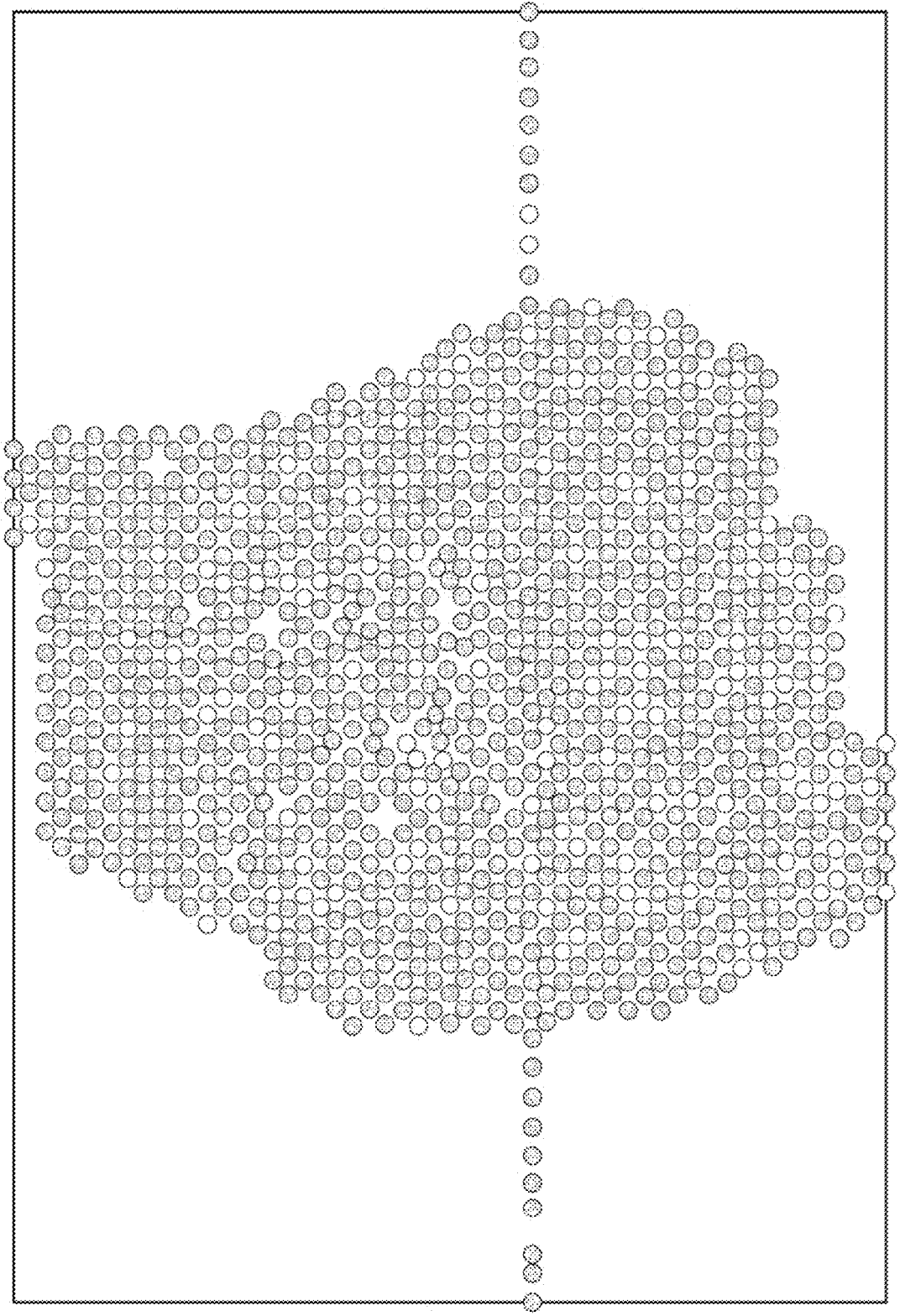
FIGS. 7a-7d are graphical views of a receiver/node map showing the RMS difference.

With reference to FIGS. 7a-7d, graphs that can be produced using the present invention reflecting node/receiver timing constraints are shown. In FIG. 7a, it is shown that a small number of receivers/nodes were given the ability to update their quadratic drift values. The black circles represent node locations where the field measured drift was correct and not modified in the inversion/conjugate gradient.

Figure 7B:
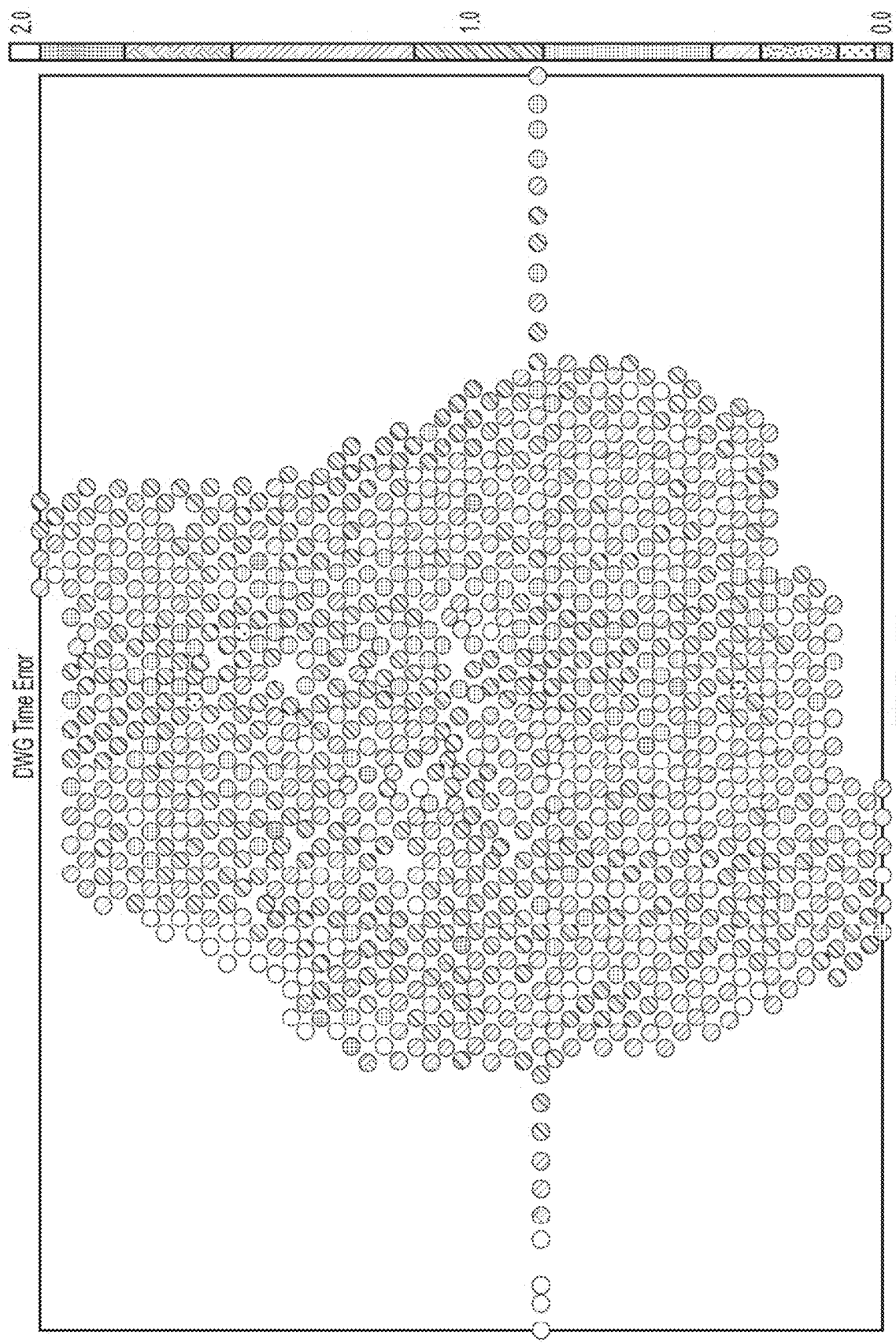
Figure 7C:
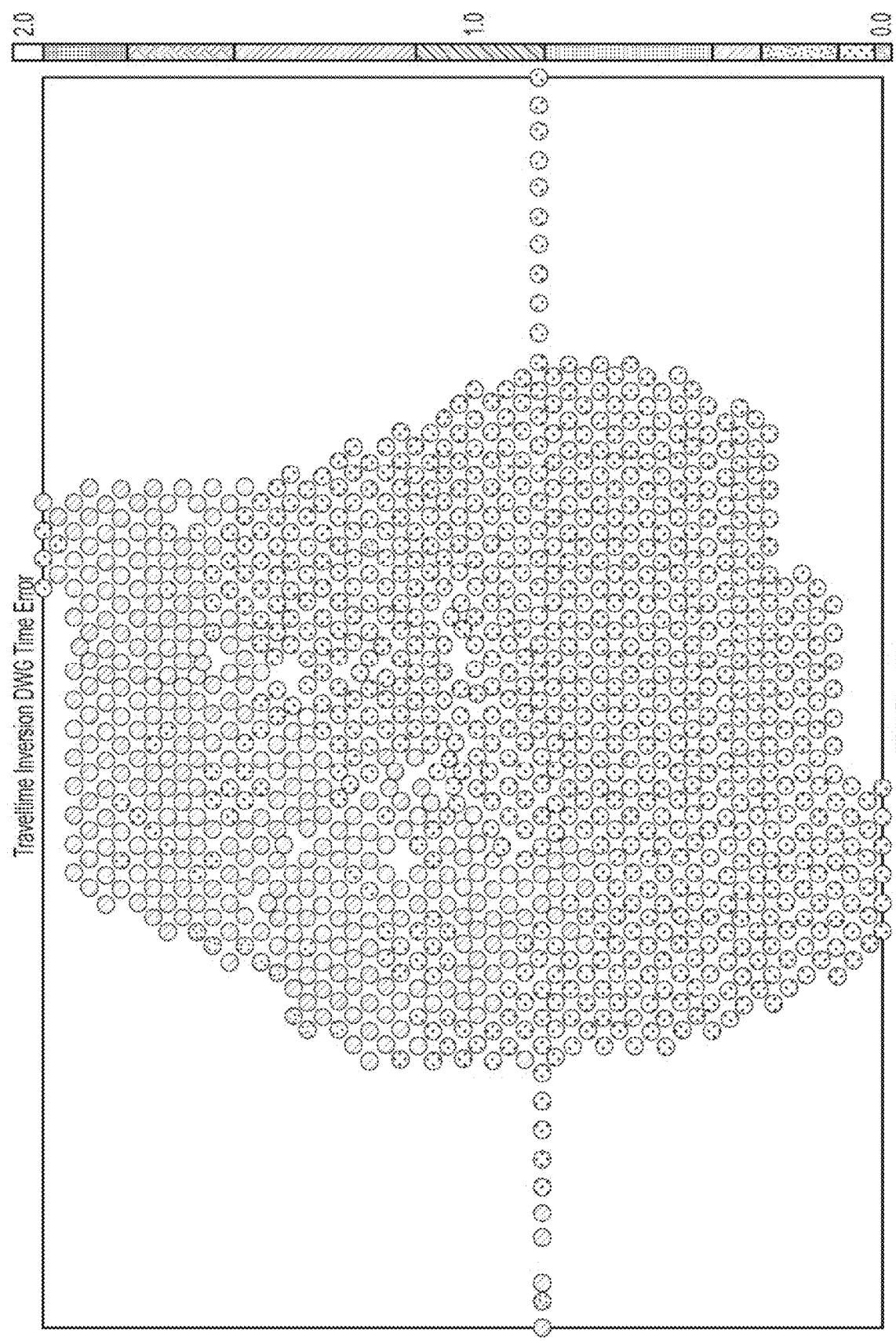
Figure 7D:
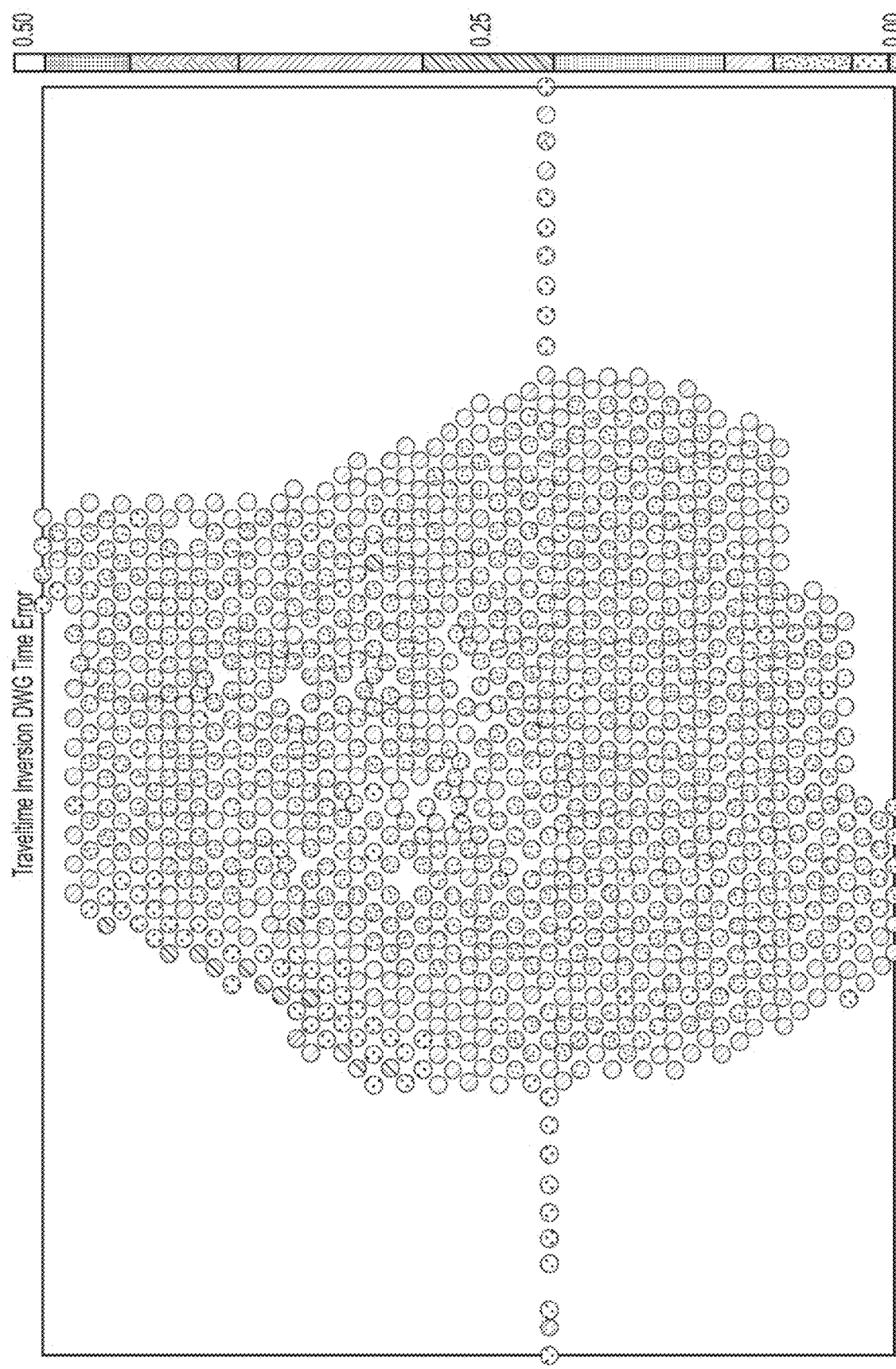

In FIG. 7b, the initial RMS time error for each node shows that improvements need to be made to positions of shots and receivers, timing of the nodes, and the velocity model. Most nodes under the initial conditions had an RMS error of between 0.8 and 1.3 msec. In FIG. 7c, the graphic represents the nodes after the timeline inversion has been run and shows very small RMS error. Finally, FIG. 7d shows the graph after the conjugate gradient has been run, with RMS errors of less than 0.08 msec for each node.

In regard to the ten circle plot of FIG. 6, each of the ten circles graphically show the RMS error of the node for which the plot was created at different stages of data conditioning. The first circle 200 graphically shows the correlation coefficients for the shots received by the node, and in the example of this Figure, the correlation is very high for all shot pairs. The next circle 202 graphically shows the initial RMS error with the constant velocity assumption having been made, with errors being too high for reliable seismic mapping. The next circle 204 graphically shows the RMS error after the node has been adjusted for bulk timing, but while maintaining the constant velocity assumption; it too produces an RMS error rate that is unacceptably high for reliable seismic mapping. The next circle 206 graphically shows the RMS error after the initial dynamic velocity model has been applied based on the PCT field measurement data; the RMS error rate remains unacceptably high for reliable 4D seismic mapping. The next circle 208 graphically shows the dynamic velocity model of circle 206, but with the slowness update applied; this improves the RMS error, but the error is still unacceptably high for reliable 4D seismic mapping. The next circle 208 graphically shows the RMS error after the receiver x and y positions have been updated; again, the RMS error is becoming smaller, but still requires improvement to have reliable 4D seismic mapping. The next circle 210 graphically shows the RMS error after the x, y, and z shot positions have been updated; the RMS error has again decreased and is becoming more uniform, but could be improved upon through further perturbations. The next circle 212 graphically shows the RMS error after the z receiver position has been updated; again improvement of the RMS error. The next circle 214 graphically shows the RMS error after the linear clock drift has been updated, and then the final circle 216 graphically shows the RMS error after the clock's quadratic drift has been updated. There is very little difference between the last three circles, as the linear and quadratic drift did not in and of themselves account for too much timing errors, but after the conjugate gradient had been fully run the RMS error reached an acceptably low level to provide for accurate and reliable 4D seismic mapping capabilities.

Although the process has been described as a sequential operation, the processing across dimensions can, and preferably does, occur simultaneously in order to minimize processing time. The ten circle plot exemplified in FIG. 6 is used to permit trouble shooting and figuring out what freedoms to give, but the most important circle is the last one, 218. To get to the last circle the inversion process preferably solves all terms given freedom simultaneously. Moreover, while a conjugate gradient has been described as a preferred way of solving the linear equations, other mathematical formulations could also be used without departing from the scope and spirit of the present invention as defined by the appended claims.

Once the RMS error has been minimized across all dimensions, the data can be used to generate accurate seismic maps. Moreover, due to the low RMS travel time error associated with the conditioned data, subsequent surveys done on the same grid can be compared more accurately to the prior surveys so as to permit more accurate assessment of changes occurring in the hydrocarbon reservoirs that were revealed in the seismic maps. Without the minimization of the travel time RMS error, changes in the water column velocity between the surveys could lead to inaccurate assessments in the changes that had occurred in the hydrocarbon reservoir. Thus, the use of the iterative perturbation model of the present invention provides a useful tool for conducting 4-D seismic surveys.

The look-up tables and processing of the perturbations is done using a computer or a computer system, wherein a computer stores the look-up tables in a database and has been programmed to read the database and process that data according to the process described herein. This could be done in a standalone work station or across multiple computers that are in communication with one another.

Working Example

A deep water node survey, with water depths ranging from 1600 m to 2300 m, is used to demonstrate the travel time inversion process. The north-western corner of the example survey was affected by a steep water bottom, in places greater than 8 degrees. The shooting patch on the survey was acquired in approximately 64 days.

For the example survey, picks with correlation coefficients less than 0.92 were rejected from the travel time inversion. The typical cause for lower correlation coefficients was the presence of interfering refracted arrivals. Otherwise, OBN recording in deep water environments is typically very quiet, with few "noisy" traces eliminated by this step.

In reference to FIG. 6, this graphic shows the measured interval velocity at 1350 m depth of each water column transit of the ROVs and subsea loaders. The vertical axis is velocity and the horizontal axis is the Julian day of the measurement. Two ROVs were used, the dark blue diamonds and light blue circles, and one subsea loader on which the measurement device was changed mid survey, pink squares and yellow triangles.

The initial parameter that has the largest effect on the results of the travel time inversion is the initial water velocity model. Early iterations of the travel time inversion used all water velocity measurements made during acquisition. During each water column transit of the ROVs (used to deploy and retrieve the nodes) and the subsea loader (a device that raises and lowers many nodes to the seafloor for more efficient deployment and retrieval of the nodes by ROV) a measurement of the water column velocities is made. These transits resulted in 79 recorded water column velocity profiles made from four different devices (two ROVs and one subsea loader on which the measurement device was replaced during the survey), each of which gave slightly different measurements. The interval velocity at 1350 m water depth can be seen in FIGS. 8a-8d for all measurements made from each measurement device. After investigation, it was determined to use only the measurements from the subsea loader, the pink squares and yellow triangles, because they were more stable and there were more measurements made with those devices. The measured velocity difference between the right end of the pink squares and the left end of the yellow triangles was initially assumed to be a bulk measurement difference between the two devices, but analysis of the recorded seismic travel times showed a significant velocity change occurred between Julian days 147 and 152. The velocities measured were assumed to be spatially constant for any given time, thus varying only by water depth and time of measurement.

When possible, the field measured values for the receiver clock drift were enforced throughout the inversion process. For this survey the field measured clock drifts were used for approximately 85% of the nodes. When constraining the inversion to allow updates to the 15% of nodes with observed unreliable drift measurements the results for the shot and receiver positions, receiver timing, and water column velocities across the survey became more stable.

FIG. 7d shows the final RMS difference of the modelled direct arrival times and actual picked direct arrival times for the example survey. In this figure the node map shows the RMS difference of the picked direct arrival times and the modelled arrival times based on the final results of the travel time inversion. The majority of the RMS errors are less than 0.1 msec. The nodes in the top left area of the map are influenced by a steep slope in the water bottom and thus more refracted energy at shorter offsets. The colour bar ranges from 0.0 msec to 0.5 msec RMS error.

Conclusions Based on Example

Travel time inversion is a vital process to identify and correct shot and receivers positioning errors in OBN acquisition. Before the travel time inversion the RMS errors of the picked versus modelled direct arrival times were between 1 msec and 2 msec, which might be an acceptable level for 3D imaging but not for 4D analysis. The results of the travel time inversion have RMS errors for most nodes less than 0.1 msec. The process builds a high frequency velocity model that varies by shooting time and water depth.

The high frequency water column velocity model will be used to correct the data for water column statics, which is vital for the processing of the node data though regularization, designature, and imaging.

The travel time inversion process accurately determines position corrections, timing corrections, and updates the high frequency water column velocity in water depths exceeding approximately 400 m. When water depths are shallow, the process has some difficulty with determining the correct clock drift timing updates. This is mainly due to the direct arrival on the nodes being influenced by other events at much shorter offsets, leading to a much smaller acquisition time window being seen by the traces used for the travel time inversion. The water velocity updates derived by the process in shallow surveys are correct, and can be used for further downstream processing.

What is claimed is:

1. A method of generating a model of a seismic surveying system comprising an array of ocean bottom nodes (OBNs), the method comprising the steps of:
    a) obtaining field measurements to define an initial model of the seismic surveying system, the model comprising estimated positions of the OBNs;
    b) measuring travel times from each of a plurality of sources to each of the OBNs for each of a plurality of shots;
    c) calculating a model travel time from each source to each of the estimated OBN positions for each of the plurality of shots, based on said field measurements;
    d) calculating a travel time error between the calculated model travel times and the measured travel times;
    e) perturbing at least one of the field measurements including at least one of the estimated OBN positions, to obtain a perturbed field measurement defining an updated model of the seismic surveying system;
    f) re-calculating the model travel times using the perturbed field measurement, after step e); and
    g) producing a refined the model of the seismic surveying system in which at least one of the estimated OBN positions is different than in the initial model, by repeating steps d)-f) until an acceptable error between the calculated model travel times and the measured travel times has been calculated.

2. The method according to claim 1, comprising the further step of perturbing at least a second of said field measurements, different than the at least one of the field measurements, and re-calculating travel times until an acceptable error has been calculated.

3. The method according to claim 2, comprising the further step of perturbing a third of said field measurements, different than the at least one of the field measurements and the second of the field measurements, and re-calculating travel time until an acceptable error has been calculated.

4. The method according to claim 3, wherein said first field measurement is an x-y position of each of the receivers, the second of said field measurements is an x-y-z position of each of the sources, and the third field measurements is the clock drift.

5. The method according to claim 1, further comprising the step of: after each perturbation is performed for said at least one of the field measurements, graphically displaying error for each receiver position.

6. A computer program stored on a non-transient storage medium and adapted to be run on a computer processor for purposes of generating a model of a seismic surveying system comprising an array of ocean bottom nodes (OBNs), the program comprising program code for:
   a) obtaining field measurements to define an initial model of the seismic surveying system, the model comprising estimated positions of the OBNs;
   b) measuring travel times from each of a plurality of sources to each of the OBNs for each of a plurality of shots;
   c) calculating a model travel time from each source to each of the estimated OBN positions for each of the plurality of shots, based on said field measurements;
   d) calculating a travel time error between the calculated model travel times and the measured travel times;
   e) perturbing at least one of the field measurements including at least one of the estimated OBN positions to obtain a perturbed field measurement defining an updated model of the seismic surveying system;
   f) re-calculating the model travel times using the perturbed field measurement, after step e); and
   g) producing a refined model of the seismic surveying system in which at least one of the estimated OBN positions is different than in the initial model, by repeating steps d)-f) until an acceptable error between the calculated model travel times and the measured travel times has been calculated.

7. The computer program of claim 6, wherein the computer program is further programmed for perturbing at least a second of said field measurements, different than the at least one of the field measurements, and re-calculating travel times until an acceptable error has been calculated.

8. The computer program according to claim 7, further comprising code for perturbing a third of said field measurements, different than the at least one of the field measurements and the second of the field measurements, and re-calculating travel time until an acceptable error has been calculated.

9. The computer program according to claim 8, wherein said first field measurement is an x-y position of each of the receivers, the second of said field measurements is an x-y-z position of each of the sources, and the third field measurements is the clock drift.

10. The computer program according to claim 6, further comprising computer code that causes error for each OBN position to be graphically displayed after each perturbation is performed for said at least one of the field measurements.

11. A computer system including a computer program stored on a non-transient storage medium and adapted to be run on a processor, the computer program generating a model of a seismic surveying system comprising an array of ocean bottom nodes (OBNs), comprising computer code for:
   a) obtaining field measurements to define an initial model of the seismic surveying system, the model comprising estimated positions of the OBNs;
   b) measuring travel times from each of a plurality of sources to each of the OBNs for each of a plurality of shots;
   c) calculating a model travel time from each source to each of the estimated OBN positions for each of the plurality of shots, based on said field measurements; and
   d) calculating a travel time RMS error between the calculated model travel times and the measured travel times;
   e) perturbing at least one of the field measurements including at least one of the estimated OBN positions to obtain to obtain a perturbed field measurement defining an updated model of the seismic surveying system;
   f) re-calculating the model travel times using the perturbed field measurements, after step e); and
   g) producing a refined model of the seismic surveying system in which at least one of the estimated OBN positions is different than in the initial model by repeating steps d)-f) until an acceptable error has been calculated between the calculated model travel times and the measured travel times.

12. The computer system according to claim 11, wherein the computer program is further programmed for perturbing at least a second of said field measurements, different than the at least one of the field measurements, and re-calculating travel times until an acceptable error has been calculated.

13. The computer system according to claim 6, further comprising computer code for perturbing a third of said field measurements, different than the at least one of the field measurements and the second field of the field measurements, and re-calculating travel time until an acceptable RMS error has been calculated.

14. The computer system according to claim 13, wherein said first field measurement is an x-y position of each of the receivers, the second of said field measurements is an x-y-z position of each of the sources, and the third field measurements is the clock drift.

15. The computer system according to claim 11, further comprising computer code that causes the error for each OBN position to be graphically displayed after each perturbation is performed for said at least one of said field measurements.

16. The method of claim 1, wherein step e) comprises simultaneously perturbing the receiver position and the clock drift.

17. The program of claim 6, wherein step e) comprises simultaneously perturbing the receiver position and the clock drift.

18. The system of claim 11, wherein step e) comprises simultaneously perturbing the receiver position and the clock drift.

19. The method of claim 1, further comprising step h) using the field measurements values corresponding to the acceptable error to generate a seismic map.

20. The computer program of claim 6, further comprising program code for a step h) using the field measurements values corresponding to the acceptable error to generate a seismic map.

21. The computer system of claim 11, further comprising program code for a step h) using the field measurements values corresponding to the acceptable error to generate a seismic map.

22. The computer system of claim 1, wherein the travel time error is an RMS travel time error.

\* \* \* \* \*

UNITED STATES PATENT AND TRADEMARK OFFICE
CERTIFICATE OF CORRECTION

PATENT NO. : 10,663,610 B2
APPLICATION NO. : 14/405564
DATED : May 26, 2020
INVENTOR(S) : Kenneth Craft et al.

Page 1 of 1

It is certified that error appears in the above-identified patent and that said Letters Patent is hereby corrected as shown below:

In the Claims

Column 12, Line 57, in Claim 1 g), delete the word "the" preceding the word model Column 14, Line 16, in Claim 11 e), delete the duplicate wording "to obtain"

Signed and Sealed this
First Day of December, 2020

Andrei Iancu
*Director of the United States Patent and Trademark Office*